United States Patent [19]

Fujimoto et al.

[11] B 4,007,463

[45] Feb. 8, 1977

[54] STATE DETECTION ARRANGEMENT FOR INK JET SYSTEM PRINTER

[75] Inventors: Isao Fujimoto, Kunitachi; Takeshi Kasubuchi; Masahiko Aiba, both of Nara, all of Japan

[73] Assignees: Nippon Telegraph and Telephone Public Corporation, Tokyo; Sharp Kabushiki Kaisha, Osaka, both of Japan

[22] Filed: Mar. 12, 1974

[21] Appl. No.: 450,413

[44] Published under the second Trial Voluntary Protest Program on March 23, 1976 as document No. B 450,413.

[30] Foreign Application Priority Data

Mar. 12, 1973 Japan ............................ 48-28688

[52] U.S. Cl. ............................................ 346/75
[51] Int. Cl.[2] ...................................... G01D 18/00
[58] Field of Search .................................... 346/75

[56] References Cited

UNITED STATES PATENTS 3,769,632 10/1973 Julisburger et al. ................ 346/75

*Primary Examiner*—Joseph W. Hartary
*Attorney, Agent, or Firm*—Stewart and Kolasch, Ltd.

[57] ABSTRACT

An ink jet system printer of the charge amplitude controlling type wherein a charge amplitude on ink drops charged by the application of phase detection signals to a charging electrode is sensed and then the relationship in phase between charging signals and ink drop separation is compensated in a manner to ensure that the ink drops are charged at an optimum state at all times. In the ink jet system there is provided a phase synchronization detection circuit for producing phase synchronization signals only when the phase relation is maintained at an optimum state due to the compensation, and a phase synchronization time period measuring circuit for determining whether the phase synchronization signals occur in sequence during a specified period of time and for producing printing ready signals if an affirmative answer is obtained.

10 Claims, 3 Drawing Figures

STATE DETECTION ARRANGEMENT FOR INK JET SYSTEM PRINTER

BACKGROUND AND SUMMARY OF THE INVENTION

The present invention relates to an ink jet system printer of charge amplitude controlling type.

In the printing art, one of the more recent improvements has been the development of an ink jet system printer of the above specified type wherein an ink stream from a nozzle having an ultrasonic vibrator is broken into ink drops at a given vibration frequency. The individual ink drops, having charge amplitudes proportional to charging signals, are passed through an electrostatic field of a fixed high voltage to effect Y direction deflection while a head having the nozzle provided thereon is horizontally carried at a fixed velocity to effect X direction deflection, for the purpose of making a record on a writing medium.

For example, in the case where ink jet system printers of the charge amplitude controlling type are employed as terminal units, a determination is required as to whether the printer is in a condition suitable for printing together with provisions for printing ready signals as a consequence of such determination. The printing ready signals should be associated not only with conditions in circuit systems but also with other various conditions such as head position, ink issuance, ink drop separation, etc. In addition, the ink issuance and separation conditions are quite unstable shortly after power throw. Though both of the condition determinations are of importance, both condition measurements are very difficult to make for practical use.

In the prior art printers, the printing ready signals are unconditionally produced after a lapse of a predetermined period of time following power throw, on the assumption that the ink issuance condition and ink separation condition becomes stable in a predetermined period. Needless to say, such a system is not favorably reliable. Moreover, if the predetermined period after power throw is chosen to be longer, this will provide timeconsuming printers. Therefore, it is very desirable to provide an arrangement for accurately detecting the ink issuance condition, ink separation condition, etc., in jet system printers.

Accordingly, an object of the present invention is to provide a system which is useful for an ink jet system printer for determining whether the printer is in a state suitable for printing.

Another object of the present invention is to provide a means for accurately detecting the phase relation between ink drop formation and charging signals, thereby producing either printing ready signals or signals in accordance with the results of said determination.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It is a matter of great importance for ink jet system printers of the charge amplitude controlling type that the phase of the charging signals are accurately synchronized with the ink drop separation. To this end, one approach has been proposed wherein detection signals are formed and applied to a charging electrode which also receives the charging signals, in order to detect the amplitude of the charge on phase detection ink drops. As a result, the charging signals are compensatively phase-controlled to be accurately synchronous with the ink drop formation cycle. This approach has been disclosed in detail in our co-pending application entitled "PHASE SYNCHRONIZATION FOR INK JET SYSTEM PRINTER" and filed on Jan. 17, 1974, Ser. No. 434,218 now abandoned.

In connection with the present invention, it may be desirable to explain, in more detail, the phase synchronization technique disclosed in the aforementioned application, since the present invention effectively utilizes teachings of such phase synchronization. In the earlier application, the phase detection signals to the charging electrode are of pulse frequency which substantially approximates one-fifth to one-tenth of an excitation cycle. If the ink drop formation is timed to be in agreement with the application of the phase detection signals, then all the ink drops will be projected toward the writing medium with their own unique charges. If the converse situation exists, the individual ink drops in the wake do not carry any charges. The amplitude of charge on the ink drops is either sensed directly, by striking these drops against an electrode plate or electrostatically, by causing them to pass adjacent the electrode plate, in order to determine whether application of the phase detection signals is in correct phase relation with respect to the ink drop separation timing.

Now that the phase detection drops have charges over a reference level, the individual phase of the applied charging signals are considered to be correctly synchronous with the ink drop separation timing. If not, it is concluded that the charging signals are not synchronized in phase with the ink drop formation, with the result that phase adjustment is automatically carried out on the phase detection signals with reference to the ultrasonic excitation signals. Providing that the phase detection signals are phase-shifted in a range from 0° to 360°, the timing of the ink drop separation does coincide with that of the application of the phase detection signals at a single point. At this instance the phase detection drops have a charge greater than the predetermined value and accordingly the phase-shifting is inhibited by the phase detection signals.

As noted earlier, the arrangement of the present invention enables detection as to whether the ink jet system printer is in the stable state or the unstable state by utilizing the measurement of the amplitude of charge on the phase detection drops attributable to the previously discussed phase synchronization.

To accomplish the objective, the state detection arrangement of the present invention comprises a phase synchronization detection circuit for detecting the amplitude of charge on phase detection drops and then providing phase OK signals each time charging signals are synchronous with the ink drop formation phase, a phase synchronization time period measuring circuit for providing printing ready signals when the phase OK signals are provided in sequence during a given period of time and a phase non-synchronization time period measuring circuit for providing error signals when the phase OK signals are not provided in sequence during the given period.

BRIEF DESCRIPTION OF THE DRAWINGS

The present invention will become more fully understood from the detailed description given hereinbelow and the accompanying drawings which are given by way of illustration only, and thus do not limit the present invention and wherein.

DESCRIPTION OF THE PREFERRED EMBODIMENTS

Figure 1:
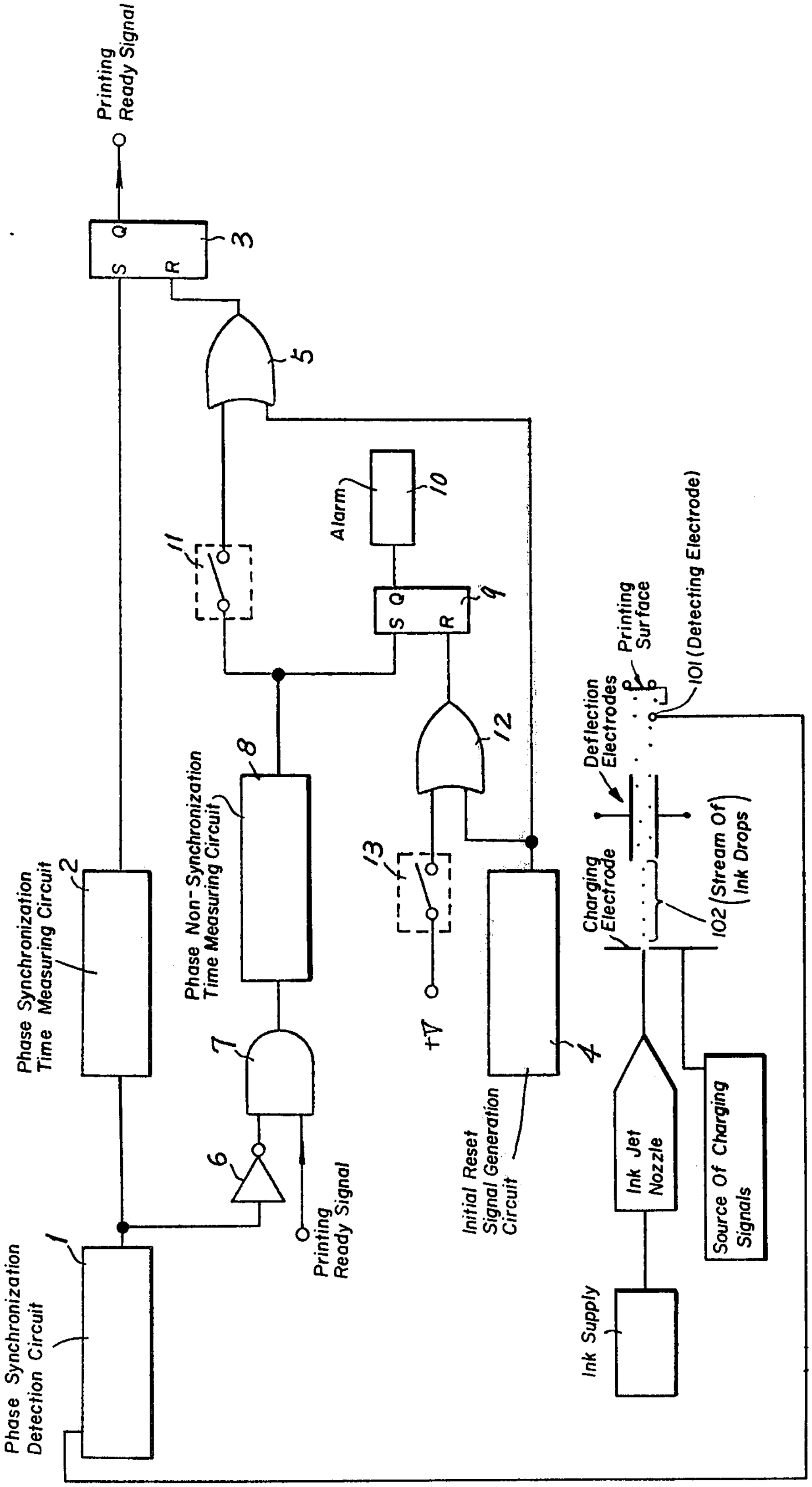
FIG. 1 is a block diagram showing a preferred embodiment of the present invention.

Referring now to FIG. 1, there is illustrated the state detection arrangement system of the present invention including a phase synchronization detection circuit 1 which produces phase OK signals of a high level when the phase relation between the phase detection signals and the ink drop formation phase is maintained at an optimum state and individual ink drops are electrostatically charged in the desired state. The phase OK signals are introduuced into a phase synchronization time period measuring circuit 2, which turns a RS flip-flop 3 to the set state when the phase OK signals are obtained in succession during a predetermined period of time, e.g., about 5 to 15 seconds. In response to this change in the flip-flop 3, print ready signals are obtained. An initial reset signals generation circuit 4 turns the RS flip-flop 3 to the reset state through an OR gate 5 upon the closing of a power switch (not shown). In other words, since the RS flip-flop 3 is initially in the reset state, the phase OK signals are obtained in succession during the predetermined period, and no printing ready signals will be produced unless the phase synchronization time measuring circuit 2 supplies the set signals to the flip-flop 3.

Generally, the ink issuance and ink drop formation conditions are unstable shortly after power throw. At a point in time when the phase relationship between the phase detection signals and the ink drop formation rhythm is out of the optimum state, a phase synchronization compensation circuit (not shown) serves to initiate phase shifting for the phase detection signals and to terminate such phase shifting when the optimum state is reached. Under the optimum state the phase synchronization detection circuit 1 provides at the output terminal thereof the phase OK signals, thereby allowing the phase synchronization time measuring circuit 2 to start its performance.

If the phase relation is not in an optimum state before the predetermined period is reached, the measured value in the phase synchronization time measuring circuit 2 is cleared to zero and the circuit 2 is returned to the initial state. At this time, the phase synchronization compensation circuit again starts the phase shifting and terminates the same when the optimum state in the phase relation is reached. Under such a second optimum state the detection circuit 1 delivers repeatedly the phase OK signals from its output terminal and measurement by the phase synchronization time measuring circuit 2 is consequently reopened.

This process is repeated several times and thereafter the ink jet system becomes stable. As a result, the phase OK signals can be obtained in succession during the predetermined period so that the RS flip-flop 3 can be reversed to the set state in response to the set signals received from the measuring circuit 2. Thus the printing ready signals are created, indicating that the ink jet system is ready for printing. Finally, the ink jet system printer performs the printing operation upon receiving the printing ready signals.

Figure 2:
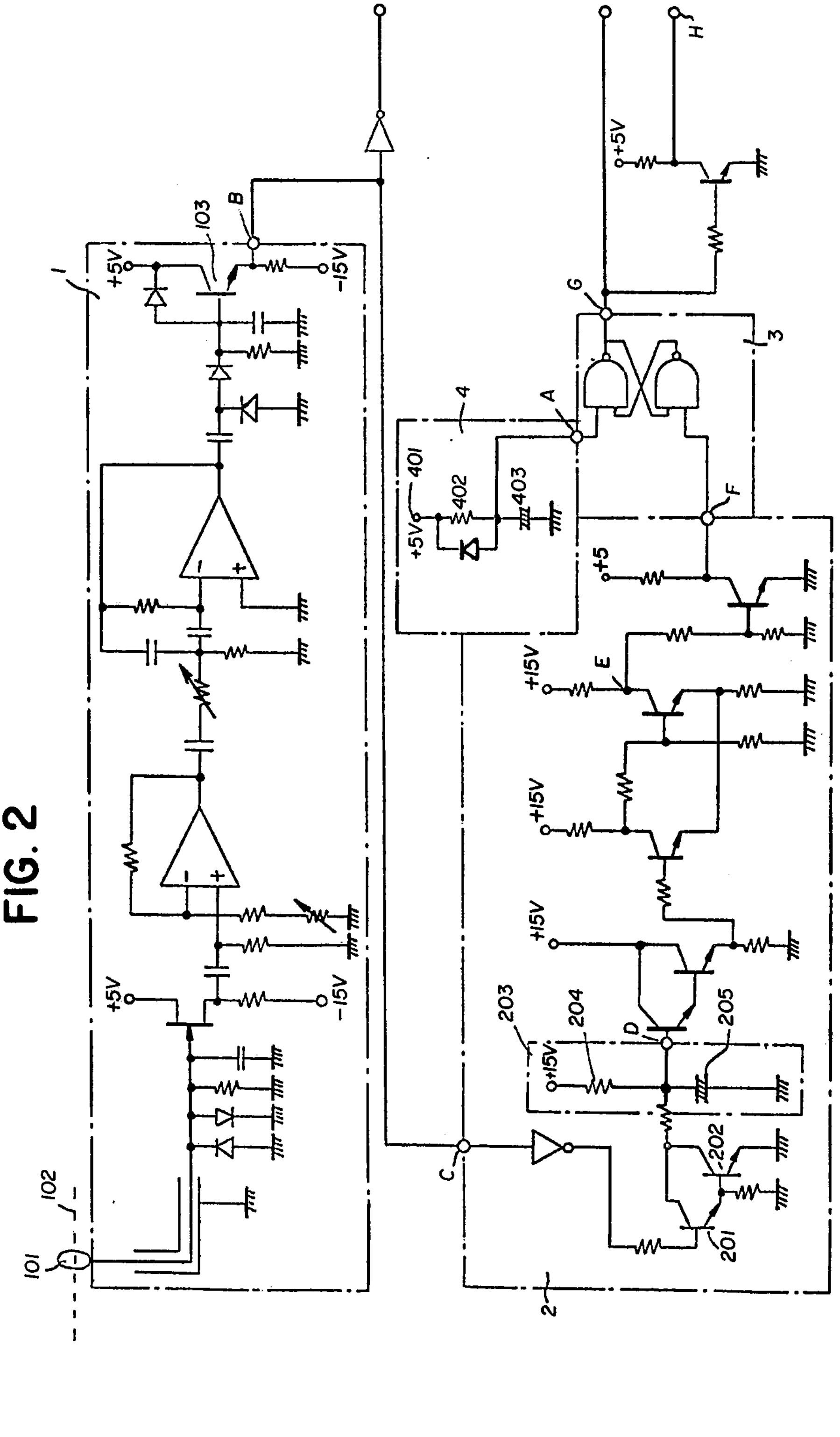
FIG. 2 is a detailed circuit diagram showing a portion of the system of FIG. 1.

FIG. 2 illustrates detailed circuit constructions of the phase synchronization detection circuit 1, the phase synchronization time measuring circuit 2, the RS flip-flop 3 and the initial reset signal generation circuit 4, previously discussed with reference to FIG. 1. A detection electrode 101 is positioned adjacent the wake or path of the ink drops 102 to detect the amplitude of charge on the ink drops 102 by virtue of electrostatic induction. If the formation rhythm of the ink drops 102 accurately coincides with the application of the phase detection signals, namely, if it is in the optimum state, the transistor 103 is ON and the potential at the point B is at a high level thereby creating the phase OK signals Bo.

Transistors 201 and 202 are both OFF when an input signal at a point C is at a high level and are On when the input signal is at a low level. When the transistors 201 and 202 are OFF, a time measuring portion 203 starts operating and the potential at a point D raises at a time constant with a resistor 204 and a capacitor 205. If the input signal C falls to a low level thereby turning the transistors 201, 202 ON in the course of an increase in the potential on the point D, the charge stored in the capacitor 205 is discharged to cause the potential at the point D to swing substantially to ground potential. The result of the potential on the point D exceeding a threshold value Vo is to produce a high level on a point E and a low level on a point F. In order for the potential on the point F to be provided at a low level, it is necessary that the pair of transistors 201 and 202 are retained OFF before the potential on the point D reaches the threshold level Vo. For these reasons, the phase synchronization time measuring circuit 2 may be used to detect whether the input signals are successively held at the high level during the predetermined period.

Within the negative-true RS flip-flop 3, the potential on a point G is at low level when the potential on the point F is at a low level, and at a high level when the potential on the point A is at a low level, these states are self-maintaining.

A terminal 401 is connected to a power supply circuit (not shown). After closing the power switch the potential on the point A increases gradually at a time constant of a resistor 402 and a capacitor 403. That is to say, upon throwing the power switch, the potential on the point A is at a low level, but increases and thereafter is held at a high level.

Figure 3:
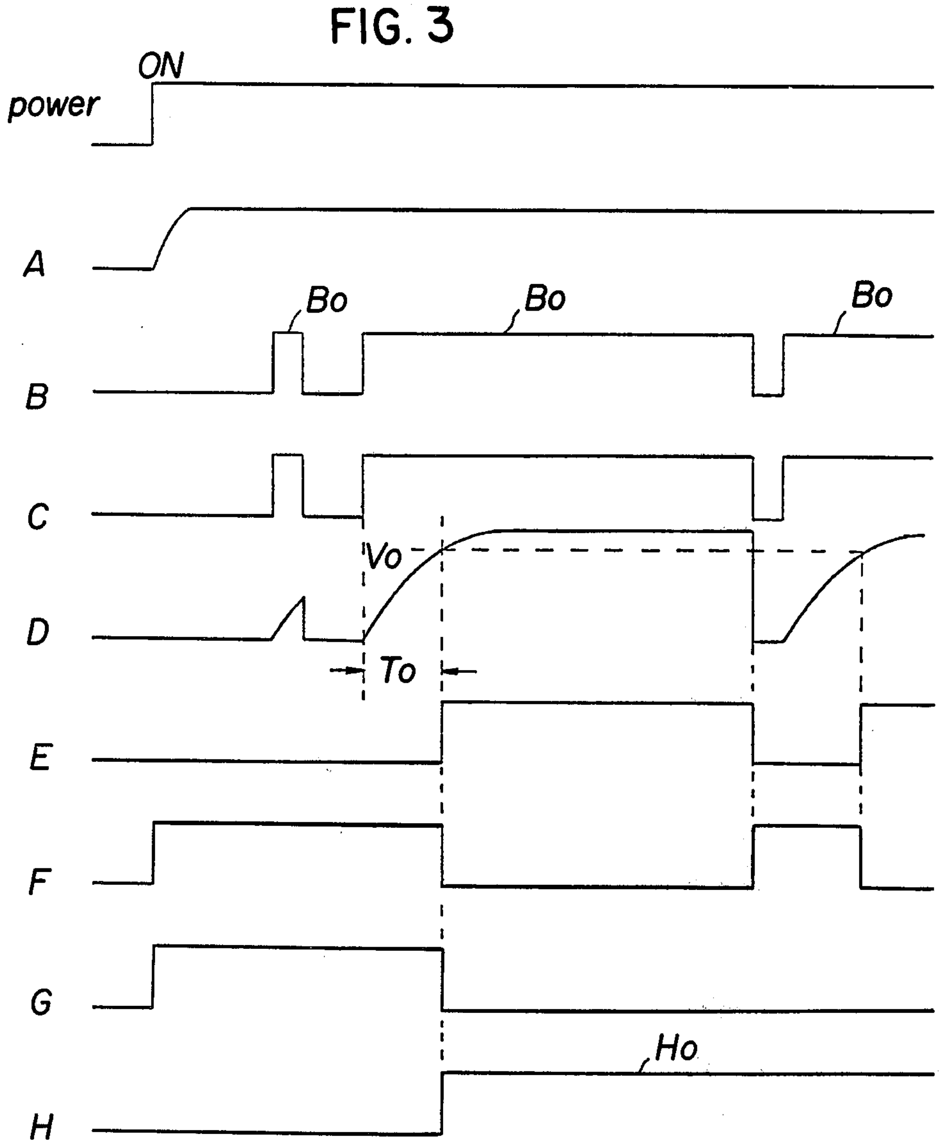
FIG. 3 is a time chart showing voltage waveforms occurring in the circuit of FIG. 2.

With reference to the time chart of FIG. 3, there is now described the functions of the circuit arrangement of FIG. 2. Upon closing of the power switch the voltage on the point 3 is at a low level at first and the voltage at the output terminal G of the RS flip-flop and is maintained at a high level. Subsequently, the voltage on the point A increases to a given level as shown by FIG. 3A. The point A will be maintained at the high level voltage until a break in the power circuit. If the ink drop formation rhythm agrees with the timing of the application of the phase detection signals, the phase OK signals appear at the terminal B and the voltage on the point D increases to a degree. In the case where the phase OK signals are obtained in succession over a predetermined period of time To, the D point voltage exceeds the threshold value Vo and the point F is held at a low level. This results in a reversal in the state of the RS flip-flop 3 together with a reduction of the G point voltage to a low level. It will be noted that the voltage waveforms obtained by a reversal in the G point voltage may serve as the desired printing ready signals. Therefore, the printing ready signals are successively created so long as the point H is held at the high level. Once the printing ready signals are created after power ON, the RS flip-flop 3 is in no way reversed, even if no phase OK signals Bo develop. This is due to the fact that point A voltage is still steady at the high level. Consequently, the printing ready signals Ho are created in succession.

Analysis of the foregoing description shows that once the phase OK signals Bo are provided in succession over a predetermined period To, the printing ready signals Ho are successively created, irrespective of the states in the ink jet system printer at that time.

The arrangement of the present invention includes a means for providing alarm signals or error signals when the ink drop formation rhythm becomes unstable in the course of the printing operation.

Reverting now to the block diagram of FIG. 1, the output signals of the phase synchronization detection circuit 1 are applied via NOT circuit 6 and AND gate 7 to the phase non-synchronization time measuring circuit 8. Another input terminal of the ANd gate 7 is connected to the printing ready signal output terminal H. In the printing process the phase non-synchronization time measuring circuit 8 detects a period where no phase OK signals Bo develop (see FIG. 3).

The structure of the phase non-synchronization time measuring circuit 8 is the same as that of the aforementioned phase synchronization time measuring circuit 2 with the exception that the values of the resistor 204 and capacitor 205 (see FIG. 2) are modified in order to shorten the predetermined period To. Under the condition where the printing ready signals are developing, failures in phase synchronization between the ink drop formation rhythm and the application rhythm of the phase detection signals prevent the generation of the phase OK signals Bo. The phase-non-synchronization time measuring circuit 8 starts measuring. In the meantime, the phase synchronization compensation circuit starts phase-shifting for the phase detection signals, the phase-shifting being stopped when phase synchronization is achieved. Once phase synchronization is ensured the phase OK signals Bo are developed, which turns the phase non-synchronization time measuring circuit 8 to the reset state or the initial state.

In the case where the period in which the phase-shifting is carried on for the purpose of phase synchronization is longer than the predetermined period To, the ink jet system is not considered to be in a suitable state for printing. However, an ink jet system in which phase-shifting terminates within a shorter period is considered to be substantially stable.

In the event that a period where no phase OK signals Bo develop is longer than the predetermined period To, the phase non-synchronization time measuring circuit 8 provides signals for turning the RS flip-flop 9 to the set state and then activating the alarm unit 10.

If the switch 11 is closed as desired, the output signals from the phase non-synchronization time measuring circuit 8 are entered through an OR gate 5 to the reset terminal of the RS flip-flop 3 thereby preventing the printing ready signals from developing. In other words, printing is automatically inhibited when the ink jet system is unstable.

The reset terminal of the RS flip-flop 9 accepts, via an OR gate 12, the outputs from the initial reset signal generation circuit 4 to turn the RS flip-flop 9 to the reset state upon the closing of the power switch. The alarm unit 10 is therefore activated only when the ink jet system is unstable. To inhibit the activation of the alarm unit 10, a switch 13 is manually closed to force the RS flip-flop 9 into a reset state.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A state detection arrangement used for an ink jet system printer for making a record on a writing medium by means of ink drops charged by charging signals, said arrangement comprising means for generating phase OK signals when an ink drop separating rhythm is synchronized with the phase of the charging signals, means for determining whether the phase OK signals are generated in succession for a predetermined period of time initiated upon the occurrence of a first phase OK signal, and means responsive to said determining means for generating printing ready signals when the phase OK signals are successively generated for said predetermined period;

wherein the printing ready signal generating means comprises bistable switching means having input and output terminals which receives at said input terminal outputs from said determining means and produces at said output terminal the printing ready signals.

2. The state detection arrangement as set forth in claim 1, wherein said ink drops are charged by phase detecting signals, means for sensing the amplitude of charge on the ink drops charged by the phase detecting signals, and means in said generating means responsive to said sensing means for generating the phase OK signals if the charge amplitude on the ink drops exceeds a given value.

3. The state detection arrangement as set forth in claim 2, wherein the sensing means comprises a detecting electrode positioned adjacent the wake of the ink drops for detecting the amplitude of charge on the ink drops by virtue of electrostatic induction.

4. A state detection arrangement used for an ink jet system printer for making a record on a writing medium by means of ink drops charged by charging signals, said arrangement comprising means for generating phase OK signals when an ink drop separating rhythm is synchronized with the phase of the charging signals, means for determining whether the phase OK signals are generated in succession for a predetermined period of time initiated upon the occurrence of a first phase OK signal and means responsive to said determining means for generating printing ready signals when the phase OK signals are successively generated for said predetermined period; and wherein the printing ready signal generating means comprises a RS flip-flop which receives at its set input terminal outputs from the determining means and produces at its output terminal the printing ready signals.

5. The state detection arrangement as set forth in claim 4, further comprising means for resetting the RS flip-flop immediately after power throw.

6. A state detection arrangement for use in an ink jet system printer for making a record on a writing medium by means of ink drops charged by charging signals comprising a phase synchronization detection circuit for generating phase OK signals when an ink drop separation rhythm is synchronized with the phase of the charging signals, a phase synchronization time measuring circuit for generating set signals where the phase OK signals are generated in succession for a predetermined period initiated by a first said phase OK signal, a RS flip-flop receiving at its set input terminal printing ready signals, an initial reset signals generation circuit for resetting the RS flip-flop immediately after power ON, and a phase non-synchronization time measuring circuit responsive to logical products of the inverted phase OK signals and the printing ready signals and generating alarm signals when the printing ready signals are generated and the inverted phase OK signals are not generated in succession for said predetermined period of time.

7. The arrangement as set forth in claim 6, wherein the RS flip-flop receives at its reset terminal the alarm signals to prevent the generation of the printing ready signals.

8. The arrangement as set forth in claim 6, further comprising an additional RS flip-flop having a set input terminal accepting the alarm signals and an output terminal connected to an alarm unit.

9. The arrangement as set forth in claim 8, wherein the outputs of the initial reset signals generation circuit are applied to a reset terminal of the additional RS flip-flop.

10. The arrangement as set forth in claim 8, wherein means is provided for forcing the additional RS flip-flop into the reset state.

* * * * *